US009544774B2

(12) United States Patent
Lee et al.

(10) Patent No.: US 9,544,774 B2
(45) Date of Patent: Jan. 10, 2017

(54) MOBILE TERMINAL AND METHOD FOR CONTROLLING THE SAME

(71) Applicant: Samsung Display Co., Ltd., Yongin-si, Gyeonggi-do (KR)

(72) Inventors: Ja Eun Lee, Suwon-si (KR); Seung Bae Lee, Seoul (KR); Byeong Hwa Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/932,876

(22) Filed: Nov. 4, 2015

(65) Prior Publication Data
US 2016/0337855 A1 Nov. 17, 2016

(30) Foreign Application Priority Data
May 15, 2015 (KR) .................. 10-2015-0068240

(51) Int. Cl.
*H04M 1/65* (2006.01)
*H04W 12/08* (2009.01)
*H04M 1/66* (2006.01)

(52) U.S. Cl.
CPC ............... *H04W 12/08* (2013.01); *H04M 1/66* (2013.01)

(58) Field of Classification Search
CPC  G06F 3/0488; G06F 3/04883; G06F 3/04817; G06F 21/36; G06F 3/0482; G06F 3/017; G06F 21/31; G06F 3/0484; G06F 3/04842; G06F 3/0486; G06F 3/0416; G06F 3/044; G06F 2203/04808; G06F 2221/031

USPC ......................................... 455/411
See application file for complete search history.

(56) References Cited

U.S. PATENT DOCUMENTS

2012/0306927 A1* 12/2012 Lee .................. G06F 3/041
345/660
2014/0181961 A1* 6/2014 Hsueh .................. G06F 21/36
726/19

FOREIGN PATENT DOCUMENTS

| KR | 10-0923182 | 10/2009 |
|---|---|---|
| KR | 10-2012-0022973 | 3/2012 |
| KR | 10-2014-0005686 | 1/2014 |
| KR | 10-2014-0047388 | 4/2014 |
| KR | 10-2015-0018028 | 2/2015 |

OTHER PUBLICATIONS

Digital Lollipop (Singapore)—Netexplo Forum 2014, https://www.youtube.com/watch?v=9YJ4FTTqWR4, Apr. 13, 2014.

* cited by examiner

*Primary Examiner* — Kwasi Karikari
(74) *Attorney, Agent, or Firm* — Innovation Counsel LLP

(57) ABSTRACT

There is provided a mobile terminal, including: a display unit; a taste providing unit providing a plurality of taste stimulations to a user through an electrical signal; and a control unit displaying a plurality of objects corresponding to the plurality of taste stimulations on the display unit, receiving an input selecting at least one of the objects from the user, and setting an arrangement of the taste stimulations corresponding to the selected object as an unlocking pattern.

16 Claims, 6 Drawing Sheets

MOBILE TERMINAL AND METHOD FOR CONTROLLING THE SAME

RELATED APPLICATIONS

This application claims priority to Korean Patent Application No. 10-2015-0068240 filed on May 15, 2015, and all the benefit accruing therefrom, the contents of which herein are incorporated by reference in their entirety.

BACKGROUND

1. Field

The described technology relates generally to a mobile terminal and a method for controlling the same.

2. Discussion of the Related Art

With the recent development of information communication technologies, mobile terminals capable of executing various functions such as the transmission and reception of call, message, and e-mail, and the use of Internet banking service have become popular. That is, users more conveniently transact their businesses using the mobile terminals with the increased availability of the mobile terminals. The users use important personal information during the transaction using the mobile terminal. Accordingly, a necessity of security for personal information and privacy protection during the use of the mobile terminal has been increased.

Therefore, manufacturers of the mobile terminals support various types of unlocking methods for the mobile terminals. For example, a slide method, a pattern lock method, a method for recognizing a fingerprint, a face, or an iris of a user, etc., have been used.

When the user inputs a pattern code to a display unit for unlocking the mobile terminal with foreign objects attached to the display unit or with foreign objects attached to the his finger, a trace may remain on a surface of the display unit along the input trajectory of the pattern code. In particular, when the user inputs the pattern code to the display unit by a drag input, the input trace of the pattern code may remain on the surface of the display unit. In this case, the pattern code may be easily disclosed to others other than the user. In this case, due to the disclosure of the pattern code, others may easily access the personal information and the privacy of the user by using the mobile terminal.

Further, when the user unlocks the mobile terminal by the input of the pattern code, the unlocking pattern may be easily figured out by others, and as a result the personal privacy is highly likely to be invaded.

When the user sets a complicated unlocking pattern or password, the security of the mobile terminal is enhanced but he/she may feel inconvenience when he/she tries to unlock the mobile terminal. On the contrary, when the user sets a simple unlocking pattern or password, he/she may conveniently unlock the mobile terminal but the security of the mobile terminal may be reduced.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a mobile terminal and a method for controlling the same having advantages of enhancing security of the mobile terminal.

An exemplary embodiment provides a mobile terminal, including: a display unit; a taste providing unit providing a plurality of taste stimulations to a user through an electrical signal; and a control unit displaying a plurality of objects corresponding to the plurality of taste stimulations on the display unit, receiving an input selecting at least one of the objects from the user, and setting an arrangement of the taste stimulations corresponding to the selected object as an unlocking pattern.

The control unit may provide the plurality of taste stimulations through the taste providing unit in any order in an unlocking mode.

The control unit may receive the input from the user and compare the taste stimulation provided through the taste providing unit with the arrangement of the taste stimulations set as the unlocking pattern when the input is received with the unlocking pattern in the unlocking mode.

The control unit may unlock the mobile terminal if the arrangement of the taste stimulations set as the unlocking pattern matches the arrangement of the taste stimulations provided through the taste providing unit when the input is received in the unlocking mode.

The control unit may determine that the input is received from the user if a touch object displayed on the display unit is touched, in the unlocking mode.

The taste providing unit may include an electrode made of silver (Ag).

The taste providing unit may apply the electrical signal to the electrode.

The electrical signal may include a current having a current value or a frequency which are changed in response to the plurality of taste stimulations, respectively.

The taste providing unit may be connected to the mobile terminal by at least one of a wired manner and a wireless manner and may be formed at an end of a body of the sensation providing apparatus which includes a pen tip and the body connected to the pen tip.

The plurality of taste stimulations may include a salty taste, a bitter taste, a sweet taste, and a sour taste.

Another embodiment provides a method for controlling a mobile terminal including: displaying a plurality of objects corresponding to a plurality of taste stimulations provided to a user through an electrical signal on a display unit; receiving an input selecting the objects from the user; and setting an arrangement of the taste stimulations corresponding to the selected object as an unlocking pattern of the mobile terminal.

The method may further include: providing the plurality of taste stimulations to the user in any order in an unlocking mode.

The method may further include: receiving an input from the user and comparing the taste stimulations provided when the input is received with the unlocking pattern with the arrangement of the taste stimulations set as the unlocking pattern in the unlocking mode.

The method may further include: unlocking the mobile terminal if the arrangement of the taste stimulations set as the unlocking pattern coincides with the arrangement of the taste stimulations provided through the taste providing unit when the input is received in the unlocking mode.

The method may further include: determining that the input is received from the user if a touch object displayed on the display unit is touched in the unlocking mode.

The providing of the plurality of taste stimulations in any order may include applying the electrical signal to an electrode made of silver (Ag).

The electrical signal may include a current having a current value or a frequency which are changed in response to the plurality of taste stimulations, respectively.

The plurality of taste stimulations may include a salty taste, a bitter taste, a sweet taste, and a sour taste.

The effects of the mobile terminal and the method for controlling the same according to the exemplary embodiments are as follows.

According to at least one of the exemplary embodiments, it is possible to protect the information stored in the mobile terminal.

According to at least one of the exemplary embodiments, it is possible to allow the user of the mobile terminal to conveniently unlock the mobile terminal.

An additional scope of applicability of the exemplary embodiment is obvious from the following detailed description. However, various changes and modifications within a spirit and a scope of the exemplary embodiment may be clearly understood those skilled in the art, and therefore the detailed description and a specific embodiment such as the exemplary embodiment is to be construed as being given as only an example.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION

Figure 1:
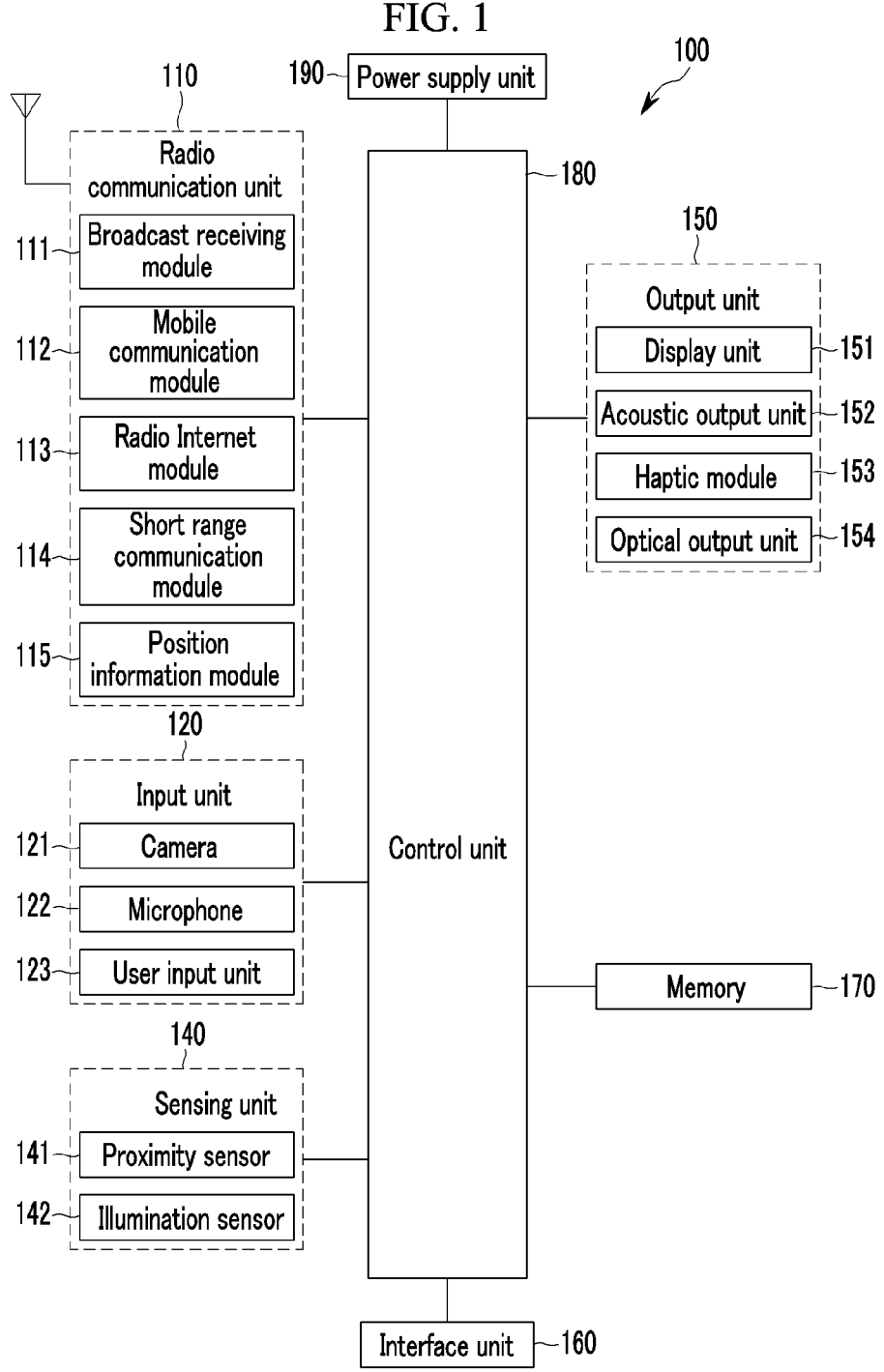
FIG. 1 is a block diagram for describing a mobile terminal according to an exemplary embodiment.

Hereinafter, embodiments will be described in more detail with reference to the accompanying drawings. The same or similar reference numerals will be used to describe the same or like components and an overlapped description thereof will be omitted. Terms "modules", and "units" for components used in the following description are used only in order to easily describe the exemplary embodiments of the inventive concept. Therefore, the above-mentioned terms do not have meanings or roles that distinguish from each other in themselves. Further, when it is determined that the detailed description of the known art related to the exemplary embodiment may obscure the gist of the exemplary embodiment, the detailed description thereof will be omitted. Further, the accompanying drawings are provided to easily understand the technical spirit of the exemplary embodiment disclosed in the present specification, and therefore the technical spirit is not limited to the accompany drawings. Therefore, it is to be construed that the accompanying drawings include all modifications, equivalents, and replacements included in the technical spirit and the technical scope disclosed in the present specification.

Terms including an ordinal number such as 'first', 'second', etc. can be used to describe various components, but the components are not to be construed as being limited to the terms. The terms are used to distinguish one component from another component.

It is to be understood that when one component is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Singular forms are to include plural forms unless the context clearly indicates otherwise.

It will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

An example of a mobile terminal described in the present specification may include a mobile phone, a smart phone, a laptop computer, a digital broadcasting terminal, personal digital assistants (PDAs), a portable multimedia player (PMP), a navigation, a slate PC, a tablet PC, an ultrabook, a wearable device (for example, a watch type terminal (smart watch), a glass type terminal (smart glass), a head mounted display (HMD)), etc.

However, it may be easily understood by those skilled in the art that a configuration according to exemplary embodiments described in the present specification may be applied to fixed terminals such as a digital TV, a desk top computer, and a digital signage, except for a case in which the configuration may be applied only to the mobile terminal.

Hereinafter, a mobile terminal and a sensation providing apparatus which is connected to the mobile terminal in a wired or wireless manner will be described with reference to FIGS. 1 to 3.

Figure 2:
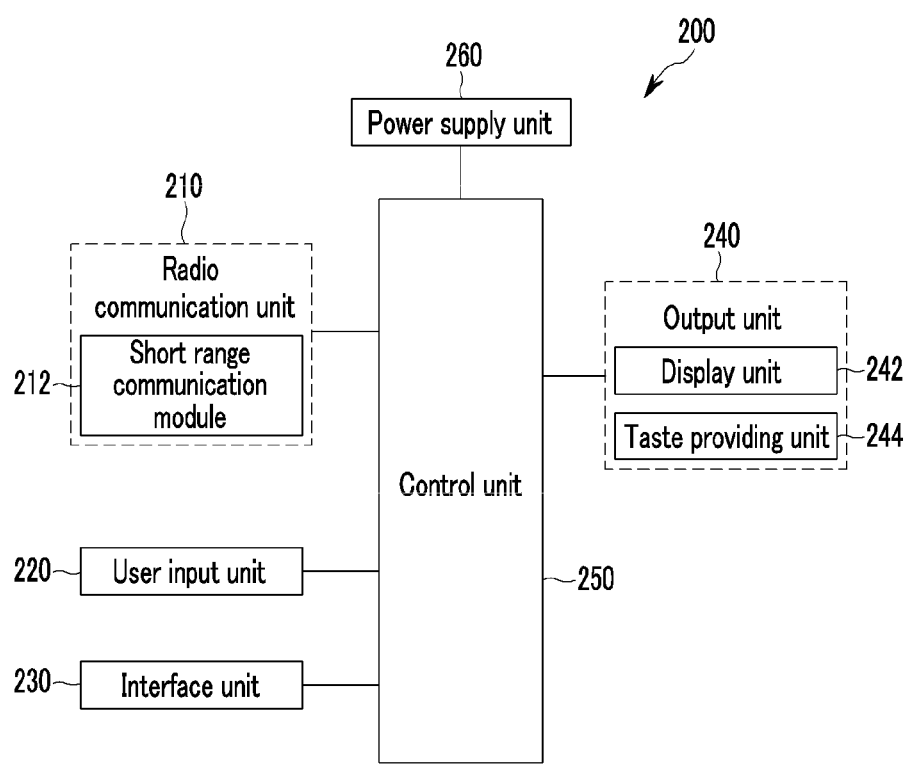
FIG. 2 is a block diagram for describing a sensation providing apparatus according to an exemplary embodiment.
Figure 3:
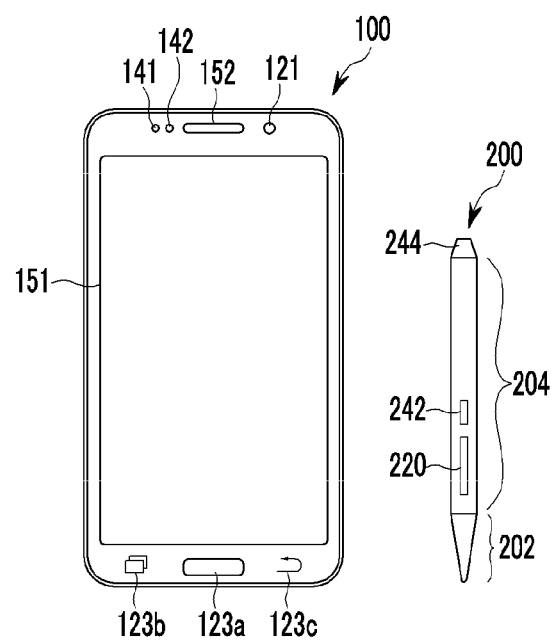
FIG. 3 is a conceptual diagram of an example of the mobile terminal and the sensation providing apparatus according to the exemplary embodiment which is viewed from one direction.

FIG. 1 is a block diagram for describing a mobile terminal according to an exemplary embodiment, FIG. 2 is a block diagram for describing a sensation providing apparatus according to an exemplary embodiment, and FIG. 3 is a conceptual diagram of an example of the mobile terminal and the sensation providing apparatus according to the exemplary embodiment which is viewed from one direction.

The mobile terminal 100 may include a radio communication unit 110, an input unit 120, a sensing unit 140, an output unit 150, an interface unit 160, a memory 170, a control unit 180, a power supply unit 190, etc. Components illustrated in FIG. 1 are not essential to implement the mobile terminal and therefore the mobile terminal described in the present specification may have more or less components than those listed above.

In more detail, among the above components, the radio communication unit 110 may include at least one module which may implement radio communication between the mobile terminal 100 and a radio communication system, between the mobile terminal 100 and other mobile terminals, or between the mobile terminal 100 and an external server. Further, the radio communication unit 110 may include at least one module which connects the mobile terminal 100 to at least one network.

The radio communication unit 110 may include at least one of a broadcast receiving module 111, a mobile communication module 112, a radio Internet module 112, a short range communication module 114, and a position information module 115.

The input unit 120 may include a camera 121 or a video input unit for inputting a video signal, a microphone 122 or an audio input unit for inputting an audio signal, and a user input unit 123 (for example, a touch key, a push key (mechanical key), etc.) for receiving information from a user. Voice data or image data collected by the input unit 120 are analyzed and thus may be processed with a control command of the user.

The sensing unit 140 may include at least one sensor for sensing at least one of information within the mobile terminal, surrounding environment information enclosing the mobile terminal, and user information. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, an RGB sensor, an infrared sensor (IR sensor), a finger scan sensor, an ultrasonic sensor, an optical sensor (for example, camera 121 (reference)), a microphone 122 (reference), a battery gauge, an environment sensor (e.g., barometer, hygrometer, thermometer, radioactivity sensing sensor, thermal sensing sensor, gas sensing sensor, etc.), and chemical sensor (e.g., electronic nose, health care sensor, biometric sensor, etc.). Meanwhile, the mobile terminal disclosed in the present specification may use combinations of information which is sensed by at least two of the sensors.

The output unit 150 is to generate an output associated with the sense of vision, the sense of hearing, the sense of touch, etc., and may include at least one of a display unit 151, an acoustic output unit 152, a haptic module 153, and an optical output unit 154. The display unit 151 forms a mutual layer structure with the touch sensor or is integrally formed with the touch sensor, thereby implementing a touch screen.

The interface unit 160 provides a path for communication of various kinds of external devices which are connected to the mobile terminal 100 with the mobile terminal 100. The interface unit 160 may include at least one of a wired/wireless headset port, an external charger port, a wired/wireless port, a memory card port, a port connecting between devices including an identification module, an audio input/output (I/O) port, a video input/output (I/O) port, and an earphone port. In the mobile terminal 100, the control unit 180 may perform an appropriate control associated with the connected external devices when the external devices are connected to the mobile terminal 100 via the interface unit 160.

Further, the memory 170 stores data necessary for supporting various functions of the mobile terminal 100. The memory 170 may store a plurality of application programs (or applications) which is driven in the mobile terminal 100, data necessary for an operation of the mobile terminal 100, and commands. At least some of the application programs may be downloaded from the external server through the radio communication. Further, at least some of the application programs may be present in the mobile terminal 100 from the time of the release of mobile terminal for basic functions (e.g., call receiving function, call sending function, message receiving function, and message sending function) of the mobile terminal 100. Meanwhile, the application programs are stored in the memory 170 and installed in the mobile terminal 100 and thus may be driven by the control unit 180 to perform the operation (or function) of the mobile terminal.

The control unit 180 generally controls the overall operation of the mobile terminal 100 in addition to the operations related to the application programs. The control unit 180 processes signals, data, information, etc., which are input or output through the above-mentioned components or drives the application programs stored in the memory 170, thereby providing the appropriate information or function to the user or processing the appropriate information or function.

Further, the control unit 180 may control at least some of the components described with reference to FIG. 1 to drive the application programs stored in the memory 170. Further, the control unit 180 may operate by combining at least two of the components included in the mobile terminal 100 to drive the application programs.

The power supply unit 190 is applied with power from the external power supply and the internal power supply to supply power to each component included in the mobile terminal 100, under the control of the control unit 180. The power supply unit 190 includes a battery which may be an embedded battery or a replaceable battery.

Next, referring to FIG. 2, the sensation providing apparatus 200 may include a radio communication unit 210, a user input unit 220, an interface unit 230, an output unit 240, a control unit 250, a power supply unit 260, etc. Components illustrated in FIG. 2 are not essential to implement the sensation providing apparatus 200 and therefore the sensation providing apparatus 200 described in the present specification may have more or less components than those listed above.

In more detail, the radio communication unit 210 among the above-mentioned components may include a short range communication module 212 which may perform the radio communication between the sensation providing apparatus 200 and the mobile terminal 100.

The short range communication module 212 is for short range communication and may support short range communication using at least one of Bluetooth™, radio frequency identification (RFID), infrared data association (IrDA), ultra wideband (UWB), ZigBee, near field communication (NFC), wireless-fidelity (Wi-Fi), Wi-Fi direct, and wireless universal serial bus (USB) technologies. The short range communication module 212 may support radio communication between the sensation providing apparatus 200 and the mobile terminal 100 or the sensation providing apparatus 200 and a network in which other mobile terminals (or external server) are positioned through wireless area networks. The wireless area networks may be wireless personal area networks.

The user input unit 220 is to receive information from a user and when information is input through the user input unit 220, the control unit 250 may control an operation of the sensation providing apparatus 200 to correspond to the input information and transmit the information to the mobile terminal 100 connected to the sensation providing apparatus 200. The user input unit 220 may include a mechanical input means (or mechanical key, for example, buttons, dome switch, jog wheel, jog switch, etc., which are positioned at front and rear surfaces or sides of the sensation providing apparatus 200) and/or a touch type input means.

The interface unit 230 serves as a path for exchanging information between the mobile terminal 100 and the sensation providing apparatus 200. The interface unit 230 receives data from the mobile terminal 100, is applied with power from an external power supply and an internal power supply and transfers the power to each component inside the sensation providing apparatus 200, or transmits data inside the sensation providing apparatus 200 to the mobile terminal 100.

The output unit 240 generates an output associated with the sense of vision, the sense of taste, or the like, and may include a display unit 242 and a taste providing unit 244.

The display unit 242 outputs a signal for informing the occurrence of events using light from a light source. The signal output from the display unit 242 is implemented by allowing the sensation providing apparatus 200 to emit monochromatic light or multicolored light to the front surface, rear surface or the side surface.

The signal output may end when the mobile terminal or the sensation providing apparatus 200 receives a signal that the event is confirmed by the user.

The user may contact the taste providing unit 244 by a tongue to receive a taste stimulation. The taste providing unit 244 includes an electrode made of silver (Ag). The taste providing unit 244 may supply an electrical signal to the user's tongue through the electrode. Next, the user may recognize the taste stimulation based on the electrical signal transferred through the electrode which contacts his/her tongue. The electrical signal supplied by the taste providing unit 244 may include a current which varies depending on a kind of tastes. For example, the electrical signal may be supplied to the user as a current having different intensities and frequencies of current corresponding to a sour taste, a sweet taste, a bitter taste, and a salty taste (sourness, sweetness, bitterness, and saltiness).

The control unit 250 controls the overall operation of the sensation providing apparatus 200. The control unit 250 processes signals, data, information, etc., which are input or output through the above-mentioned components, thereby providing the appropriate information or function to the user or processing the appropriate information or function.

The power supply unit 260 supplies power from the external power supply and the internal power supply to supply power to each component included in the sensation providing apparatus 200, under the control of the control unit 250. The power supply unit 250 includes a battery which may be an embedded battery or a replaceable battery.

At least some of the above-mentioned components may be operated in cooperation with each other to implement the operation and the control of the mobile terminal or the method for controlling the same according to various exemplary embodiments described to be below. Further, the operation and the control of the sensation providing apparatus 200 or the method for controlling the same may be implemented in the mobile terminal connected to the sensation providing apparatus 200 by driving at least one application program stored in the memory 170.

Referring to FIG. 3, the disclosed mobile terminal 100 includes a bar type terminal body. However, the exemplary embodiment is not limited thereto but may be applied to various structures such as a watch type, a clip type, a glass type, a folder type in which at least two bodies are coupled with each other to relatively move, a flip type, a slide type, a swing type, and a swivel type. The exemplary embodiment is associated with a specific type but the description of the specific type of the mobile terminal may be generally applied to other types of mobile terminals.

The mobile terminal 100 includes a case (for example, frame, housing, cover, etc.) forming an appearance of the mobile terminal 100. As illustrated, the front surface of the body of the mobile terminal 100 may be provided with the display unit 151 to output information.

The mobile terminal 100 may include an acoustic output unit 152, a proximity sensor 141, an illumination sensor 142, a camera 121, first to third manipulating units 123a, 123b, and 123c, etc.

However, these components are not limited to the disposition as illustrated in FIG. 3. These components are excluded or replaced as needed or may be disposed on other surfaces. For example, the front surface of the terminal body may not be provided with the first manipulating unit 123a.

The display unit 151 displays (outputs) the information processed by the mobile terminal 100. For example, the display unit 151 may display execution screen information of application programs driven by the mobile terminal 100 or user interface (UI) and graphic user interface (GUI) information depending on the execution screen information.

The display unit 151 may include at least one of a liquid crystal display (LCD), a thin film transistor-liquid crystal display (TFT LCD), an organic light-emitting diode (OLED), a flexible display, a 3D display, and an e-ink display.

Further, more than one display unit 151 may be present depending on types of the mobile terminal 100. In this case, in the mobile terminal 100, the plurality of spaced apart display units may be disposed on one surface, or the plurality of display units may be integrally disposed on one surface and may be disposed on different surfaces.

The display unit 151 may include a touch sensor sensing a touch on the display unit 151 so that it may receive a control command by a touch of the user. By using this, when the touch on the display unit 151 is performed, the touch sensor senses the touch and the control unit 180 may be configured to generate the control command corresponding to the touch based on the sensed touch. The input by the touch sensor may be characters or numbers or may be commands, designable menu items, or the like, in various kinds of modes.

The sound output unit 142a may be implemented as a speaker which transfers a call sound to user's ears.

The camera 121 processes an image frame of a still image or a motion picture which is obtained by the image sensor in a photographing mode or a video-telephony mode. The processed image frame may be displayed on the display unit 151 and may be stored in the memory 170.

The first to third manipulating units 123a, 123b, and 123c are an example of the user input unit which is manipulated to input a command to control the operation of the mobile terminal 100 and may be collectively called a manipulating portion. The first to third manipulating units 123a, 123b, and 123c may adopt any manner as long as they are based on a tactile manner by which a user performs a manipulation while getting tactile feeling like touch, push, scroll, etc. Further, the first to third manipulating units 123a, 123b, and 123c may adopt a manner of performing a manipulation without the tactile feeling of the user through a proximity touch, hovering touch, etc. The present drawing illustrates that the second and third manipulating units 123b and 123c are a touch key, but the exemplary embodiment is not limited thereto.

Next, the disclosed sensation providing apparatus 200 includes a pen type terminal body. The sensation providing apparatus 200 includes a pen tip 202 for inputting a touch command to a touch screen and a body 204 connected to the pen tip 202. The user grips the body 204, approaches the pen tip 202 to the touch screen 151 to be able to input the touch command to the mobile terminal 100.

The body 204 may be provided with the user input unit 220 and the display unit 242. According to a pressing or touching by the user, for example, pressing frequency, a speed of pressing a plurality of circuits, pressing duration, etc., and the control unit 250 outputs the processed signal to each component.

Further, the taste providing unit 244 may be provided at an end of the body 204. The user may contact his/her tongue to the taste providing unit 244 to sense a taste provided by the sensation providing apparatus 200.

The mobile terminal 100 and the sensation providing apparatus 200 may be connected to each other through the interface units 160 and 230 in a wired manner to transfer information. That is, the sensation providing apparatus 200 may be operated as if it is included in the mobile terminal 100.

Alternatively, the short range communication module 114 of the mobile terminal 100 and the short range communication module 212 of the sensation providing apparatus 200 may communicate with each other using wireless communication.

Hereinafter, exemplary embodiments associated with a control method which may be implemented in the mobile terminal 100 configured as described above will be described with reference to the accompanying drawings.

Figure 4:
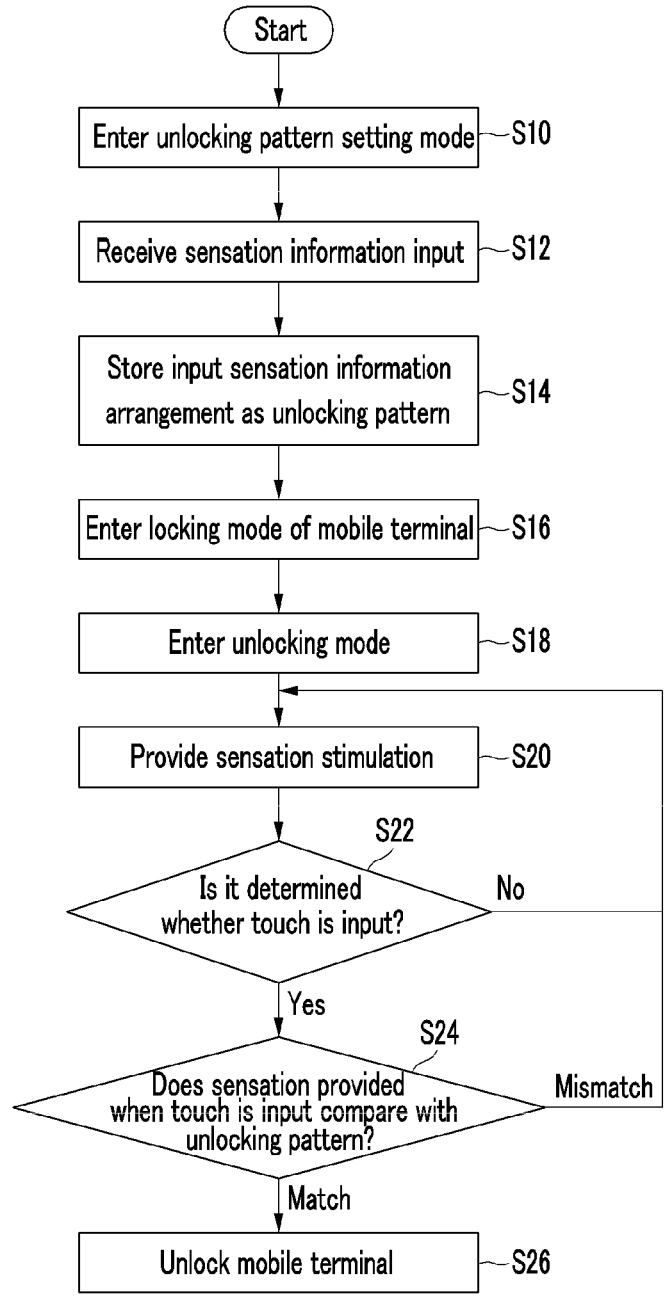
FIG. 4 is a flow chart illustrating a method for controlling a mobile terminal according to an exemplary embodiment.
Figure 5:
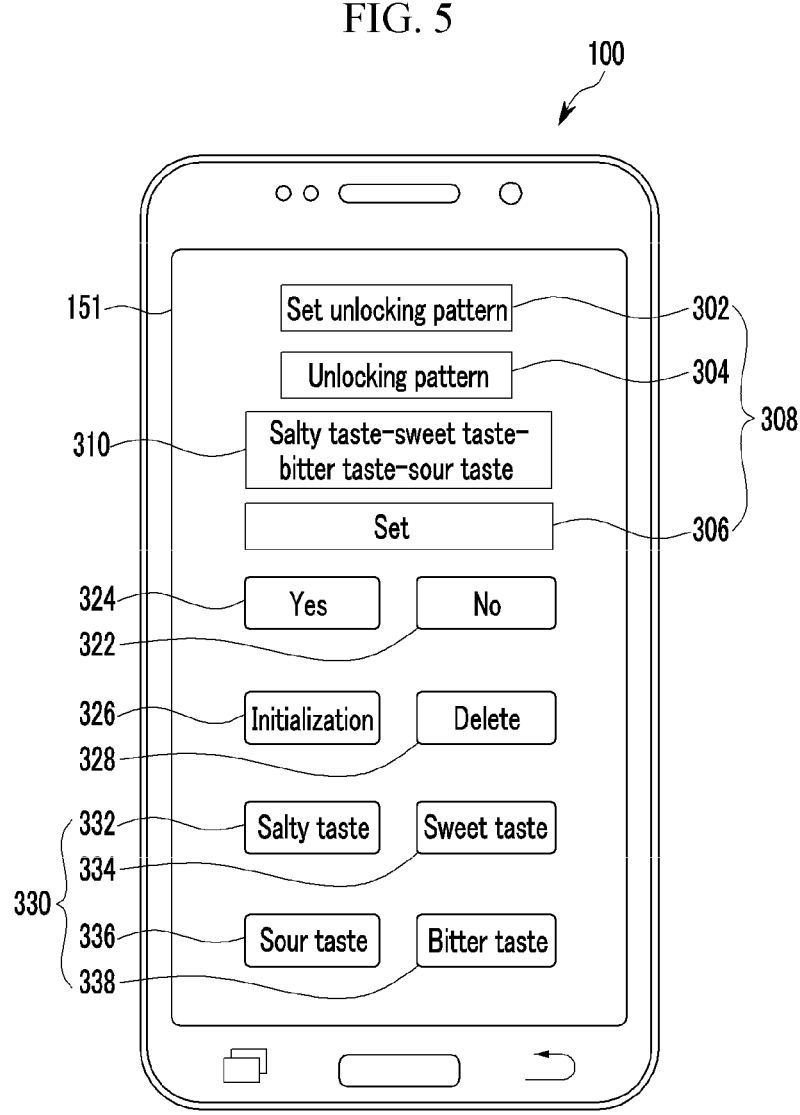
FIG. 5 is an exemplified diagram illustrating a screen setting an unlocking pattern of the mobile terminal according to the exemplary embodiment.
Figure 6:
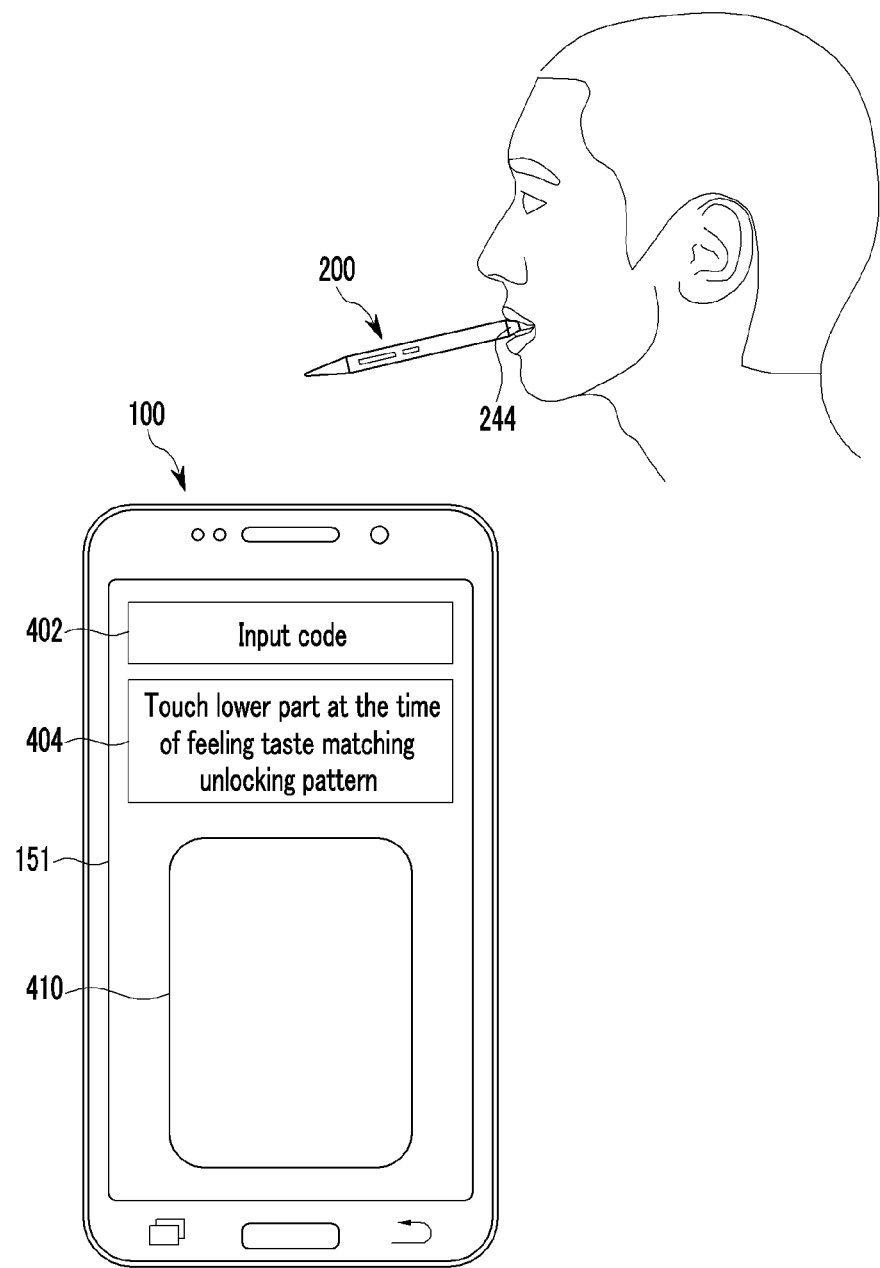
FIG. 6 is an exemplified diagram of the unlocking of the mobile terminal according to the method for controlling a mobile terminal according to the exemplary embodiment.

FIG. 4 is a flow chart illustrating a method for controlling a mobile terminal according to an exemplary embodiment, FIG. 5 is an exemplified diagram illustrating a screen setting an unlocking pattern of the mobile terminal according to the exemplary embodiment, and FIG. 6 is an exemplified diagram of the unlocking of the mobile terminal according to the method for controlling a mobile terminal according to the exemplary embodiment.

As illustrated in FIG. 4, the mobile terminal 100 enters an unlocking pattern setting mode (S10). The control unit 180 enters a mode for setting the unlocking pattern using an arrangement of sensation information and, as illustrated in FIG. 5, may display a screen for setting the unlocking pattern on the display unit 151.

The unlocking pattern setting screen may include objects 330 corresponding to four tastes which may be provided from the sensation providing apparatus 200 to the user and a display window 310 displaying the arrangement of the sensation information in the order that the user selects the objects.

Further, the unlocking pattern setting screen may include guide sentence 308 which includes a sentence 302 which indicates the present screen is an unlocking pattern setting screen and queries whether or not using the arrangement of the sensation information displayed on the display window 310 as the unlocking pattern.

Further, the unlocking pattern setting screen may include an object 322 and 334 which selects whether or not the arrangement of the sensation information displayed on the display window 310 is used as the unlocking pattern, an object 326 which initializes the arrangement of the sensation information displayed on the display window 310, and an object 328 which deletes the sensation information displayed on the display window 310 individually.

The control unit 180 allows the user to receive an input selecting the sensation information object displayed on the display unit 151 (S12) and sets the arrangement of the input sensation information as the unlocking pattern of the mobile terminal 100 (S14).

That is, the user may touch at least one of the objects 330 to arrange the sensation information and set the arranged sensation information as the unlocking pattern of the mobile terminal 100. Hereinafter, it is assumed that the sensation information which is arranged in order of salty taste, sweet taste, bitter taste, and sour taste is set as the unlocking pattern of the mobile terminal 100.

Next, the mobile terminal 100 enters a locking mode (S18). The control unit 180 may enter the mobile terminal 100 into the locking mode when the user does not use the mobile terminal 100 for a predetermined time or depending on the user's manipulation which manipulates the mobile terminal locking button, etc.

Next, the mobile terminal 100 enters the unlocking mode by the input of the user trying to use the mobile terminal 100 (S20). When the user manipulates the mobile terminal 100 or selects the unlocking mode entry object displayed on the display unit 151, the control unit 180 enters the mobile terminal into the unlocking mode and as illustrated in FIG. 6, may display the screen for unlocking on the display unit 151.

The unlocking screen includes a sentence 402 which guides the present screen is the unlocking screen, a sentence 404 which guides an unlocking method, and a region 410 which is to be touched by the user at the time of providing the taste stimulation.

The control unit 180 displays the unlocking screen and then provides the taste stimulations to the user by the sensation providing apparatus 200 connected to the mobile terminal 100. In detail, the sensation providing unit 244 may supply the electrical signal to the electrode which contacts the user's tongue depending on the signal transferred from the control unit 180. The taste providing unit 244 supplies the electrical signal corresponding to the taste stimulations arranged in any order to the electrode.

For example, the taste providing unit 244 changes the intensity or frequency of current supplied to the electrode to make the user feel tastes in the order of bitter taste, sweet taste, salty taste, sweet taste, and sour taste depending on the signal transferred from the control unit 180.

Further, the control unit 180 determines whether the user touches the region 410 (S22). If it is determined that the user touches the region 410, the control unit 180 compares the taste provided to the user through the taste providing unit 244 at the time of the touch input with the arrangement of the sensation information configuring the unlocking pattern.

For example, if the taste providing unit 244 provides the sour taste, the sweet taste, the bitter taste, and the salty taste to the user in any order, when the user feels taste matching the arrangement of the sensation information configuring the unlocking pattern set by the user, he/she touches the region 410.

Next, when the user touches the region 410, the control unit 180 may determine whether the taste provided to the user matches the salty taste which is a first taste in the arrangement of the sensation information set as the unlocking pattern.

As described above, if the taste provided to the user when the user touches the region 410 among the taste stimulations provided in any order is an order of the salty taste, the sweet taste, the bitter taste, and the sour taste arranged as the unlocking pattern, the control unit 180 unlocks the mobile terminal (S26).

Meanwhile, in step S22, if it is determined that the user does not touch the region 410, the control unit 180 provides the taste stimulations arranged in any order to the user (S20). Herein, the any order may be a random order.

Further, in step S24, if the taste provided to the user when the user touches the region 410 among the taste stimulations provided in any order does not match the unlocking pattern, the control unit 180 provides the taste stimulations arranged in any order to the user (S20) or may enter the mobile terminal 100 into the locking mode.

Further, it is described that the control unit 180 displays the screen receiving the touch input from the user in step S20 and receives the touch input from the user in step S22, but the method for controlling a mobile terminal may also be performed through all the inputs which are input from the user through the user input unit, in addition to the touch input.

For example, the control unit 180 may compare the taste provided to the user through the taste providing unit 244 at the time of the user input through the push key in step S24 with the arrangement of the sensation information configuring the unlocking pattern.

The foregoing exemplary embodiment may implement as codes which may be read by a computer in a medium in which programs are recorded. The medium which may be read by the computer includes all kinds of recording apparatuses in which data read by a computer system are stored. An example of the medium which may be read by the computer may include a hard disk drive (HDD), a solid state disk (SSD), a silicon disk drive (SDD), a ROM, a RAM, a CD-ROM, a magnetic tape, a floppy disk, an optical data storage apparatus, and the like and may include one implemented in a form of a carrier wave (e.g., transmission through the Internet). Further, the computer may also include the control unit 180 of the terminal. Therefore, the foregoing detailed description is not to be restrictively construed in all aspects but should be reckoned as being exemplary. The scope of the exemplary embodiment is to be determined by a reasonable interpretation of the appending claims and all the changes within an equivalent range of the exemplary embodiment are included in the scope of the exemplary embodiment.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mobile terminal, comprising:
    a display unit;
    a taste providing unit providing a plurality of taste stimulations to a user through an electrical signal, the plurality of taste stimulations including at least two taste simulations among a salty taste, a bitter taste, a sweet taste and a sour taste; and
    a control unit displaying a plurality of objects corresponding to the plurality of taste stimulations on the display unit, receiving an input selecting at least one of the objects from the user, and setting an arrangement of the taste stimulations corresponding to the selected object as an unlocking pattern.

2. The mobile terminal of claim 1, wherein:
    the control unit provides the plurality of taste stimulations through the taste providing unit in any order in an unlocking mode.

3. The mobile terminal of claim 2, wherein:
    the control unit receives the input from the user and compares the taste stimulation provided through the taste providing unit with the arrangement of the taste stimulations set as the unlocking pattern when the input is received with the unlocking pattern in the unlocking mode.

4. The mobile terminal of claim 3, wherein:
    the control unit unlocks the mobile terminal if the arrangement of the taste stimulations set as the unlocking pattern coincides with the arrangement of the taste stimulations provided through the taste providing unit when the input is received in the unlocking mode.

5. The mobile terminal of claim 3, wherein:
    the control unit determines that the input is received from the user if a touch object displayed on the display unit is touched in the unlocking mode.

6. The mobile terminal of claim 1, wherein:
    the taste providing unit includes an electrode made of silver (Ag).

7. The mobile terminal of claim 6, wherein:
    the taste providing unit applies the electrical signal to the electrode.

8. The mobile terminal of claim 1, wherein: the electrical signal includes a current having a current value or a frequency which are changed in response to the plurality of taste stimulations, respectively.

9. The mobile terminal of claim 1, wherein:
    the taste providing unit is connected to the mobile terminal by at least one of a wired manner and a wireless manner and is formed at an end of a body of a sensation providing apparatus which includes a pen tip and the body connected to the pen tip.

10. A method for controlling a mobile terminal, comprising:
    displaying a plurality of objects corresponding to a plurality of taste stimulations provided to a user through an electrical signal on a display unit, the plurality of taste stimulations including at least two taste simulations among a salty taste, a bitter taste, a sweet taste and a sour taste;
    receiving an input selecting the objects from the user; and
    setting an arrangement of the taste stimulations corresponding to the selected object as an unlocking pattern of the mobile terminal.

11. The method of claim 10, further comprising:
    providing the plurality of taste stimulations to the user in any order in an unlocking mode.

12. The method of claim 11, further comprising:
    receiving an input from the user and comparing the taste stimulations provided when the input is received with the unlocking pattern with the arrangement of the taste stimulations set as the unlocking pattern in the unlocking mode.

13. The method of claim 12, wherein:
    unlocking the mobile terminal if the arrangement of the taste stimulations set as the unlocking pattern coincides with the arrangement of the taste stimulations provided through the taste providing unit when the input is received in the unlocking mode.

14. The method of claim 12, further comprising:
    determining that the input is received from the user if a touch object displayed on the display unit is touched in the unlocking mode.

15. The method of claim 11, wherein:
    the providing of the plurality of taste stimulations in any order includes applying the electrical signal to an electrode made of silver (Ag).

16. The method of claim 15, wherein:
the electrical signal includes a current having a current value or a frequency which are changed in response to the plurality of taste stimulations, respectively.

* * * * *